United States Patent [19]
Kawabata

[11] Patent Number: 5,865,096
[45] Date of Patent: Feb. 2, 1999

[54] COFFEE BREWING APPARATUS

[75] Inventor: Akio Kawabata, Isesaki, Japan

[73] Assignee: Sanden Corp., Isesaki, Japan

[21] Appl. No.: 122,430

[22] Filed: Jul. 24, 1998

[51] Int. Cl.$^6$ .................................................. A47J 31/34
[52] U.S. Cl. ........................... 99/302 P; 99/302 R; 99/283
[58] Field of Search .................... 99/302 R, 302 P, 99/287, 297, 299, 283

[56] References Cited

U.S. PATENT DOCUMENTS

| | | | |
|---|---|---|---|
| 5,259,297 | 11/1993 | Giuliano | 99/302 R X |
| 5,280,747 | 1/1994 | Bonneville et al. | 99/302 R X |
| 5,299,491 | 4/1994 | Kawada | 99/302 R X |

*Primary Examiner*—Reginald L. Alexander
*Attorney, Agent, or Firm*—Kenjiro Hidaka

[57] ABSTRACT

A coffee brewing apparatus has a first cylinder for containing hot water having a top opening, a vertically extending shaft fixedly connected to the first cylinder, the shaft having a hot water release channel vertically therethrough and a pressure-operated hot water release valve disposed in the channel, a vertically movable piston, a vertically movable second cylinder for holding ground coffee therein having top and bottom openings and disposed below the first cylinder coaxially therewith, and a vertically movable plunger sealingly and slidingly connected with the shaft. The plunger has an internal cylindrical chamber and a shallow hot water spreading chamber in a bottom section thereof. When the plunger is lowered, the bottom section thereof enters the second cylinder and compacts the ground coffee therein. As the piston enters the first cylinder through the top opening thereof and further descends, the hot water in the first cylinder is pressurized so that the hot water release valve opens and pressurized hot water in the first cylinder is released through the hot water release channel in the shaft, the cylindrical chamber and the hot water spreading chamber of the plunger to be poured onto the ground coffee in the second cylinder.

9 Claims, 3 Drawing Sheets

COFFEE BREWING APPARATUS

BACKGROUND OF THE INVENTION

1. Field of the Invention

The present invention relates to a coffee brewing apparatus, which is used particularly in an automatic coffee dispenser.

2. Description of the Prior Art

One of popular coffee brewing methods is to pour hot water onto ground coffee so that the hot water extracts coffee ingredient while passing through the ground coffee. In a simple method, the hot water passes down through the ground coffee by its own gravity. There is also a conventional method in which the hot water is forced to pass through ground coffee under pressure.

FIG. 3 shows a conventional coffee brewing system used in an automatic coffee dispenser. The system includes a water supply line 210, a water shutoff valve 211, a water heater 212, a hot water supply line 213, a hot water shutoff valve 214, and a coffee brewing apparatus 200, which is shown in elavational section.

The coffee brewing apparatus 200 includes a hot water supply cylinder 201 for containing hot water, a piston 202, a cylindrical ground coffee holder 203, a strainer 204 and a coffee outlet funnel 205. The top open end of the ground coffee holder 203 is removably and sealingly fitted to the bottom open end of the hot water supply cylinder 201. The strainer 204 is tightly interposed between the ground coffee holder 203 and the coffee outlet funnel 205. The piston 202 is adapted to sealingly and slidingly fit the hot water supply cylinder 201 internally.

A predetermined quantity of ground coffee 203c is deposited in the holder 203 before it is fitted to the hot water supply cylinder 201. The water provided through the water supply line 210 to the water heater 212 is heated up to a near boiling temperature at a regulated pressure. A predetermined quantity of hot water 201w is provided from the water heater 212 into the hot water supply cylinder 201 through the hot water supply line 213 by opening the valve 214 for a predetermined time period. Then, the piston 202 is lowered into the cylinder 201 so that the hot water 201w in the cylinder 201 and most of the air trapped in the cylinder 201 are forced down through the ground coffee 203c in the holder 203. The hot water extracts coffee ingredient from the ground coffee 203c while passing therethrough and comes out through the strainer 204 and the coffee outlet funnel 205, as shown by an arrow in FIG. 3.

Another popular conventional coffee brewing method is to deposit ground coffee into hot water and blow air into the mixture of the hot water and the ground coffee so that the ground coffee is agitated in the hot water. This method, however, is not adequate for producing strong coffee because it requires a comparatively large quantity of hot water per unit quantity of ground coffee.

Whereas some disadvantages are known pertaining to the method by the apparatus 200 shown in FIG. 3. Since the ground coffee 203c is loosely deposited in the ground coffee holder 203, granules of the ground coffee 203c tend to shift from one place to another in the holder as the hot water flows down in the holder. This results in a creation of a partial hot water flow path in the holder, which is known as "channeling". The channeling effect causes the ground coffee in the holder to be subjected to the hot water unevenly. Since the channeling occurs randomly in the holder, coffee liquid of varied density tends to be produced in each coffee making process. In the above described coffee brewing method by the apparatus 200, the hot water starts to flow down through the ground coffee as soon as the cylinder 201 starts receiving hot water before the piston 202 enters the cylinder 201 to force the hot water down. This early flow of hot water also causes undesirable "channeling" in the ground coffee.

SUMMARY OF THE INVENTION

In view of the above situation, it is a primary object of the present invention to provide a coffee brewing apparatus suitable for an automatic coffee dispenser, in which no "channeling" occurs in the ground coffee and coffee liquid of even density is produced in every coffee brewing process.

In order to achieve the object, the coffee brewing apparatus according to the present invention has the following features.

The coffee brewing apparatus has a frame; a first cylinder, having a top opening and a bottom, connected to the frame for containing a predetermined quantity of hot water; a vertically movable piston for pressurizing the hot water in the first cylinder, the piston being disposed coaxially with the first cylinder and being adapted to enter the first cylinder through its top opening and sealingly and slidingly fit the first cylinder internally; a vertically extending shaft fixedly connected to the bottom of the first cylinder, the shaft having a hot water release channel vertically therethrough; a pressure-operated hot water release valve disposed in the hot water release channel which opens when hot water in the first cylinder is pressurized to a specified critical pressure by the piston; a vertically movable second cylinder for holding ground coffee therein, the second cylinder being disposed below the first cylinder coaxially therewith and supported by the frame in a vertically movable manner, the second cylinder having a top opening and a bottom opening; a vertically movable and vertically extending plunger having a cylindrical internal chamber and a bottom section, the bottom section having a shallow hot water spreading chamber for spreading hot water radially evenly onto the ground coffee in the second cylinder, the plunger being sealingly and slidably connected with the shaft in a manner that the hot water spreading chamber communicates with inside of the first cylinder through the cylindrical chamber of the plunger and the hot water release channel of the shaft when the hot water release valve is in an open state, the bottom section being adapted to enter the second cylinder through its top opening to be fitted in the second cylinder sealingly and slidingly so as to compact ground coffee in the second cylinder when the plunger is lowered; a filter support block fixedly connected to the frame and disposed below the second cylinder, the filter support block integrally having a coffee outlet funnel; and a replaceable paper filter disposed on the filter support block.

The piston and the second cylinder can be vertically moved by a first actuating mechanism including a first cam and a second actuating mechanism including a second cam, respectively. The first cam and the second cam are fixedly mounted on a common cam shaft that is driven by a common cam drive motor.

The mechanism for actuating the plunger comprises a bi-directional second motor, a vertical screw shaft bi-directionally driven by the second motor, and a vertically movable arm that is meshed with the screw shaft and connected with the plunger, so that the plunger can be moved by the second motor either upwardly or downwardly.

The replaceable paper filter is horizontally disposed on the filter support block in a manner that the filter can be held tightly sandwiched between the filter support block and the second cylinder so that the filter covers the bottom opening of the second cylinder when the second cylinder is at its lowest level.

A predetermined quantity of ground coffee is deposited in the second cylinder when the second cylinder is at the lowest level. Simultaneously, a predetermined quantity (for one cup) of hot water is supplied into the first cylinder. Then, the plunger is lowered so that the bottom section of the plunger enters the second cylinder, touches and compacts the ground coffee therein. On the other hand, the piston is lowered into the first cylinder so that the descending piston causes the air trapped in the first cylinder and the hot water therein to be pressurized. As the piston keeps descending, the pressure of the hot water increases and opens the pressure-operated hot water release valve at a specified critical pressure, thereby causing the hot water to be released through the hot water release channel in the shaft, the cylindrical chamber and the hot water spreading chamber in the plunger, and poured onto the compacted ground coffee in the second cylinder. Coffee brewing takes place in the second cylinder as the hot water passes down through the ground coffee and coffee liquid drops through the paper filter and comes out of the coffee outlet funnel in the filter support block.

Since the ground coffee is preliminarily compacted by the plunger and completely confined in the second cylinder between the bottom section of the plunger on the top and the paper filter on the bottom, granules of the ground coffee can never shift to create a partial hot water flow path. Furthermore, since the hot water release valve keeps the hot water from being discharged until its pressure reaches the specified critical pressure, the ground coffee will not prematurely be subjected to the hot water before it is compacted and completely packed in the second cylinder. Thus, there will be no occurrence of undesirable channeling in the ground coffee and coffee liquid of even density is produced in every coffee brewing process in the coffee brewing apparatus according to the present invention.

DETAILED DESCRIPTION OF THE PREFERRED EMBODIMENTS

Figure 1:
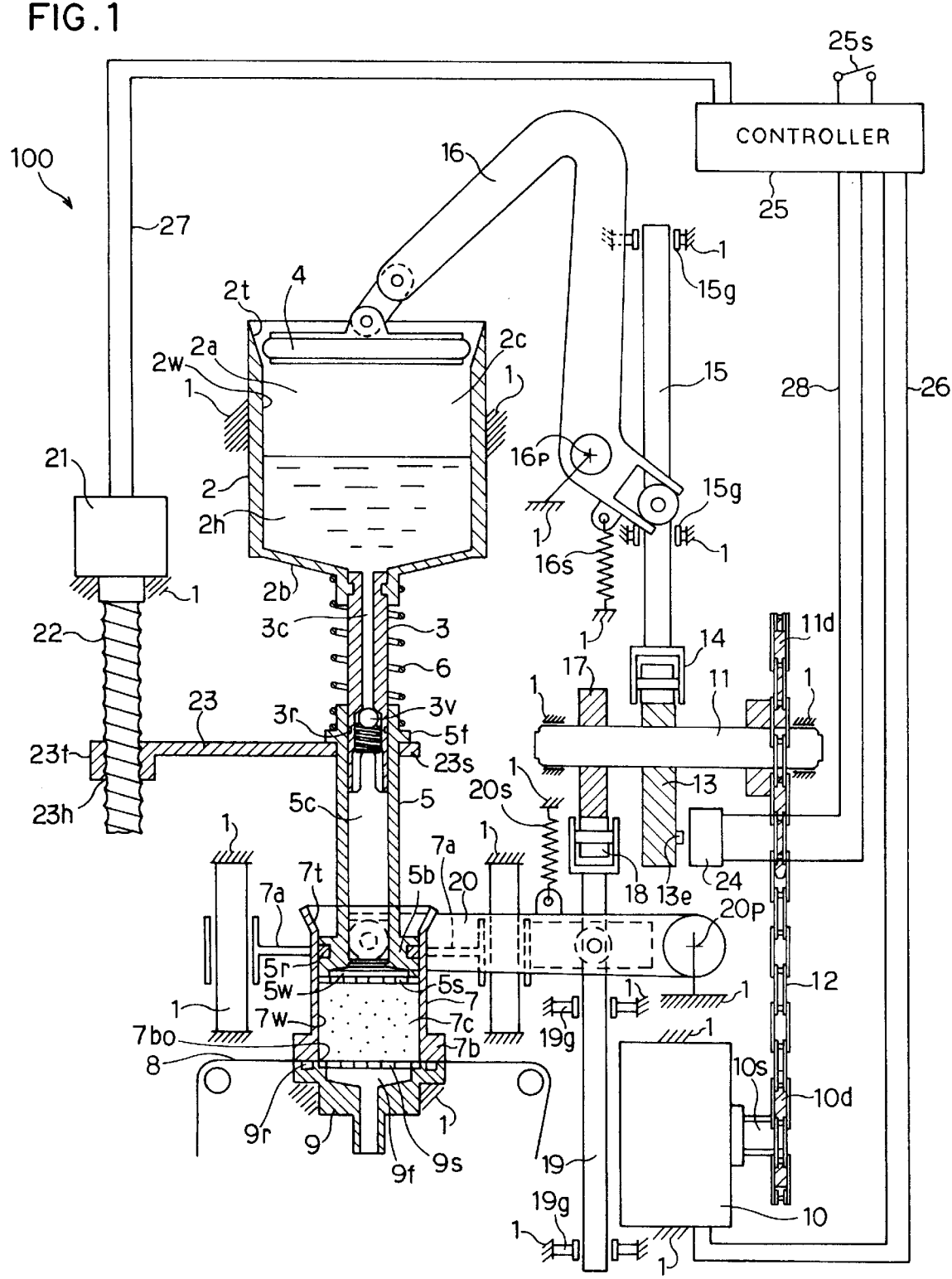
FIG. 1 shows a coffee brewing apparatus according to the present invention, in which the apparatus is shown in partially elevational section and partially diagrammatically.

The present invention will now be described in detail in reference to FIG. 1.

A coffee brewing apparatus 100 according to the present invention has a frame 1; a hot water supply cylinder 2 connected to the frame 1; a vertical hot water outlet shaft 3 fixedly connected to the cylinder 2; a vertically movable hot water pressurizing piston 4; a vertically disposed and vertically movable cylindrical ground coffee compacting plunger 5 slidably connected with the shaft 3; a compression coil spring 6; a vertically movable coffee brewing cylinder 7 disposed below the hot water supply cylinder 2 and the shaft 3; a replaceable paper filter 8; a round filter support block 9 disposed under the coffee brewing cylinder 7; a first servo motor 10 having a drive shaft 10s; a driving sprocket 10d fixedly mounted on the drive shaft 10s; a cam shaft 11; a driven sprocket lid fixedly mounted on the cam shaft 11; a drive chain 12 that runs over the driving sprocket 10d and the driven sprocket lid; a piston actuating cam 13 fixedly mounted on the cam shaft 11; a position sensor element 13e fixed on a side surface of the cam 13; a piston actuating cam follower 14; a piston actuating cam follower rod 15; cam follower rod guides 15g; a piston actuating lever linkage 16; a pivot 16p for the lever linkage 16; a tension spring 16s for rotationally urging the lever linkage 16 in a clockwise direction about the pivot 16p; a coffee brewing cylinder actuating cam 17 fixedly mounted on the cam shaft 11; a coffee brewing cylinder actuating cam follower 18; a coffee brewing cylinder actuating cam follower rod 19; cam follower rod guides 19g; a coffee brewing cylinder actuating lever 20; a pivot 20p for the lever 20; a tension spring 20s for rotationally urging the lever 20 in a clockwise direction about the pivot 20p; a bi-directional second servo motor 21 for actuating the ground coffee compacting plunger 5; a vertically disposed rotary screw shaft 22 bi-directionally driven by the motor 21; a plunger supporting arm 23; a position sensor switch 24 that is activated by the position sensor element 13e; a controller 25; a start switch 25s; a first motor drive circuit 26, a second motor drive circuit 27, and a position sensor switch circuit 28.

The hot water supply cylinder 2, the shaft 3, the piston 4, the plunger 5, the spring 6, the coffee brewing cylinder 7, and the filter support block 9 are disposed vertically aligned and coaxially with one another. The cylinder 2, the shaft 3, and the filter support block 9 are stationary. The piston 4 and the plunger 5 can vertically be moved by the cams 13 and 17, respectively, which are together driven by the first motor 10, as will be explained in detail later.

The hot water supply cylinder 2 has a top opening 2t, a sloped bottom 2b, a hot water containing chamber 2c, and a cylindrical side wall 2w of the chamber 2c.

The hot water outlet shaft 3 has a hot water outlet channel 3c in the diametrical center thereof and vertically therethrough, a pressure-operated, spring-loaded hot water release valve 3v disposed in a low end part of the channel 3c, and a sealing ring 3r fitted to its side periphery. The shaft 3 is fixedly connected to the bottom 2b of the cylinder 2 in a manner that the inlet to the hot water outlet channel 3c is disposed in the diametrical center of the sloped bottom 2b of the cylinder 2.

The plunger 5 has integrally an external flange 5f in a proximity of its top, a diametrically enlarged bottom section 5b, a cylindrical internal chamber 5c, a shallow, inverted funnel-like hot water spreading chamber 5w in the bottom section 5b, a flat strainer 5s having a number of perforations, and a sealing ring 5r fitted to the side periphery of the bottom section 5b. The strainer 5s is securely attached to the bottom end of the bottom section 5b immediately under the hot water spreading chamber 5w. The diametrically enlarged bottom section 5b has an external diameter substantially equal to the internal diameter of the chamber 7c of the coffee brewing cylinder 7.

The shaft 3 and the plunger 5 is slidably connected with each other in a manner that the shaft 3 is inserted to the chamber 5c of the plunger 5 and the sealing ring 3r seals between the shaft 3 and the plunger 5. When the valve 3v is open, therefore, inside of the cylinder 2 and the hot water spreading chamber 5w of the plunger 5 are communicated with each other through the hot water outlet channel 3c of the shaft 3 and the cylindrical chamber 5c of the plunger 5.

The compression coil spring 6 is disposed between the bottom 2b of the hot water supply cylinder 2 and the flange 5f of the plunger 5 in a manner that the shaft 3 is disposed through the spring 6, so that the plunger 5 is always downwardly urged by the spring 6. A first end part 23f of the plunger supporting arm 23 has a threaded hole 23h that is meshed with the screw shaft 22. A forked second end part 23s of the arm 23 upholds the plunger 5 in its flange 5f, so that as the screw shaft 22 is rotated by the motor 21 the arm 23 moves vertically, thereby causing the plunger 5 to be moved upwardly or downwardly depending on the rotational direction of the motor 21.

The coffee brewing cylinder 7 has a top opening 7t, a coffee brewing chamber 7c and a cylindrical side wall 7w of the chamber 7c. The cylinder 7 is not only connected to the frame 1 by connecting arms 7a in a vertically slidable manner but also pivotally connected to the coffee brewing cylinder actuating lever 20. The cylinder 7 has a bottom section 7b having a radially increased wall thickness and a bottom opening $7b_0$. The outside diameter of the bottom section 7b matches the outside diameter of the top part of the filter support block 9.

The filter support block 9, which is fixedly connected to the frame 1, has a coffee outlet funnel 9f integrally therewith, a flat strainer 9s, and a sealing ring 9r fitted to its top flat surface. The strainer 9s, having a number of perforations, is fitted to the top of the block 9 covering the funnel 9f in a manner that the top of the strainer 9s and the top of the block 9 are flush with each other. When the coffee brewing cylinder 7 is lowered to its lowest dead position (LDP), the bottom section 7b thereof presses the paper filter 8 against the top of the filter support block 9, whereby the filter 8 is sandwiched between the cylinder 7 and the block 9 and kept from sagging by the strainer 9s. At this time, the sealing ring 9r causes to maintain the sealing between the cylinder 7 and the block 9.

When the piston 4 is at its highest dead position (HDP), the piston is upwardly apart from the top opening 2t of the hot water supply cylinder 2. When the piston 4 is lowered from its HDP, it enters the cylinder 2 through its top opening 2t and fits the cylinder 2 internally, maintaining sliding and sealing contact with the side wall 2w of the chamber 2c thereof.

When the plunger 5 is at its highest dead position (HDP), the bottom section 5b of the plunger 5 is upwardly apart from the top opening 7t of the coffee brewing cylinder 7. When the plunger 5 is lowered from its HDP, the bottom section 5b enters the cylinder 7 through its top opening 7t and fits the cylinder 7 internally, maintaining sliding and sealing contact with the side wall 7w of the chamber 7c thereof. The sealing ring 5r fitted to the periphery of the bottom section 5b of the plunger 5 provides sealing between the bottom section 5b and the side wall 7w of the chamber 7c.

Figure 2:
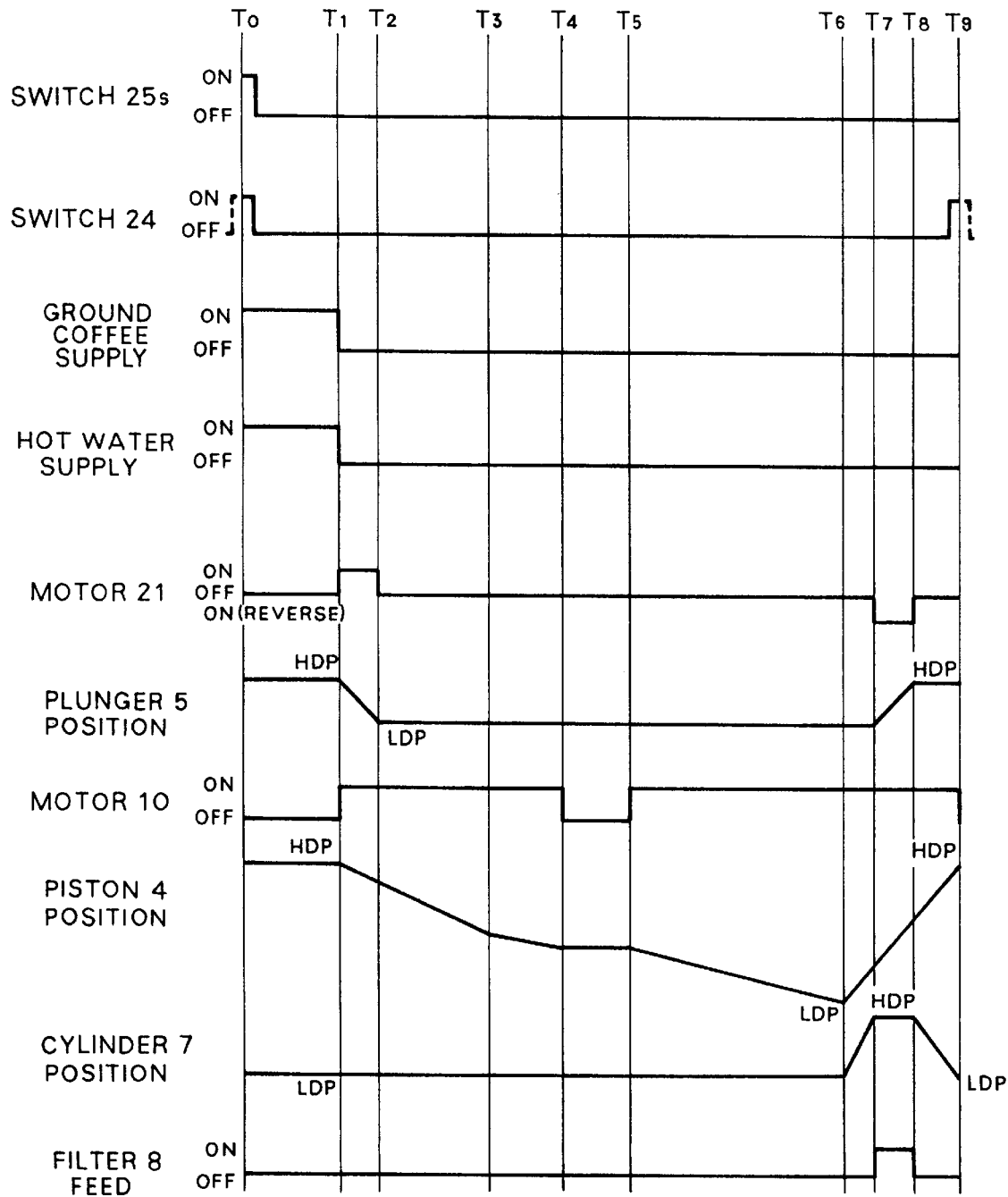
FIG. 2 is a diagrammatic timing chart to explain the function of the coffee brewing apparatus shown in FIG. 1.
Figure 3:
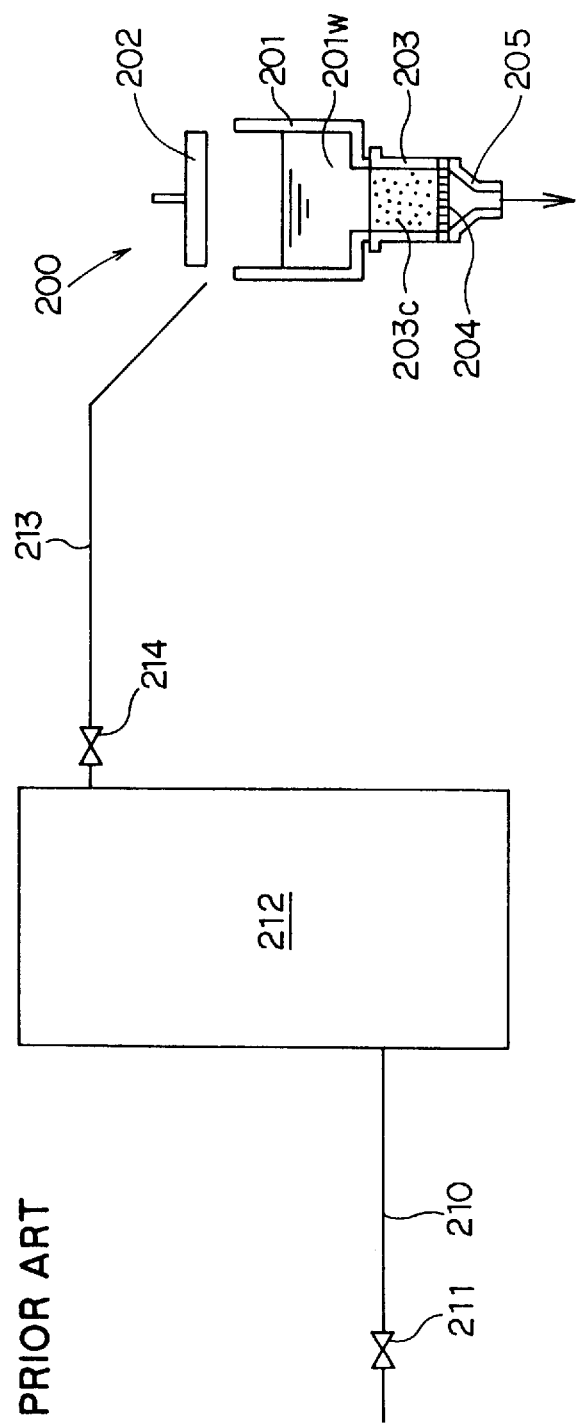
FIG. 3 shows a system including a conventional coffee brewing apparatus, which is shown in elevational section.

FIG. 2 is a diagrammatic timing chart to explain the function of the coffee brewing apparatus 100.

Now, the function of the coffee brewing apparatus 100 will be explained in reference to FIGS. 1 and 2.

In FIG. 2, it is assumed that a customer of the coffee vending machine including the coffee brewing apparatus 100 presses the start switch 25s at time $T_0$ to purchase a cup of coffee.

Whenever the position sensor element 13e fixed on the cam 13 opposes the position sensor switch 24, the switch 24 will be in an ON state and an ON signal is transmitted from the switch 24 to the controller 25. The actuating mechanism of the piston 4, including the cam 13, and the actuating mechanism of the cylinder 7, including the cam 17, are so designed that when the switch 24 is in an ON state the piston 4 and the cylinder 7, respectively, are at the highest dead position (HDP) and the lowest dead position (LDP), respectively. When the piston 4 is at its HDP, whereby the cylinder 7 is at its LDP and the switch 24 is in the ON state, the apparatus 100 is deemed to be in its "initial stand-by state".

A coffee dispensing cycle of the apparatus 100 normally ends in the initial stand-by state, as will be explained in detail later. However, if the apparatus 100 is not in the initial standby state, the output of the switch 24 will be OFF when the customer presses the start switch 25s. In such a case, as soon as the switch 25s is pressed, the controller 25 causes to drive the first motor 10 to rotate the cams 13 and 17 until the sensor element 13e opposes the position sensor switch 24, thereby causing the apparatus 100 to be reset in the initial stand-by state. Since such control procedure for resetting mechanism to its initial state is a prior known art, the procedure is not reflected on the timing chart in FIG. 2. The timing chart is provided on the assumption that the apparatus 100 is already in the initial stand-by state when the customer presses the switch 25s.

In the initial stand-by state of the apparatus 100, the piston 4 is at its HDP and upwardly apart from the top opening 2t of the cylinder 2, the plunger 5 is also at its HDP and the bottom section 5b thereof is upwardly apart from the top opening 7t of the cylinder 7, but the cylinder 7 is at its LDP.

As soon as the switch 25s is turned ON at time $T_0$, provided that the switch 24 is ON, the controller 25 causes to provide a predetermined quantity (for one cup) of hot water 2h to the cylinder 2 and, simultaneously, ground coffee 7c to the cylinder 7 by turning ON a hot water supply device (not shown) and a ground coffee supply device (not shown), respectively, for a preprogrammed period $T_0 \sim T_1$.

Then, at time $T_1$, the controller 25 causes the first motor 10 to be ON for period $T_1 \sim T_4$, thereby causing the cams 13, 17 to rotate. Simultaneously, at time $T_1$, the controller 25 also causes the second motor 21 to be ON for period $T_1 \sim T_2$ in such rotational direction as to lower the plunger 5. Then, the bottom section 5b of the plunger 5 will enter the cylinder 7 through its top opening 7t, and before the plunger 5 reaches its LDP the strainer 5s of the plunger 5 will touch the ground coffee 7c and, therefore, the plunger 5 will press down the ground coffee 7c as it reaches its LDP. At time $T_2$, the plunger 5 reaches its LDP and stops, while the ground coffee 7c is compacted by the plunger 5.

The controller 25 causes the motor 21 to be OFF during period $T_2 \sim T_7$ so that the plunger 5 stays at its LDP, ON again, but for the reverse direction, during period $T_7 \sim T_8$, so that the plunger 5 quickly ascends from its LDP to HDP, and OFF during period $T_8 \sim T_9$.

The controller 25 causes the motor 10 to be ON during period $T_1 \sim T_4$, OFF during period $T_4 \sim T_5$, and ON again during period $T_5 \sim T_9$. Although the motor 10 turns at a constant speed, the cam 13 is so formed that the piston 4 descends at a first speed during period $T_1 \sim T_3$, at a second speed, which is slower than the first speed, during period $T_3 \sim T_4$, descends further at a third speed, which is slower than the first speed but faster than the second speed, during period $T_5 \sim T_6$, and quickly ascends from its LDP to HDP during period $T_6 \sim T_9$.

The cam 17 is rotated always together with the cam 13 during periods $T_1 \sim T_4$ and $T_5 \sim T_9$ at a constant speed because both the cams 13, 17 are fixedly mounted on the common drive shaft 11. The cam 17 is so formed that the cylinder 7 stays at its LDP during period $T_0 \sim T_6$, quickly ascends from its LDP to HDP during period $T_6 \sim T_7$, stays at its HDP during period $T_7\sim T_8$, and quickly descends from its HDP to LDP during period $T_8\sim T_9$.

As the piston 4 enters the cylinder 2 after hot water has been provided into the cylinder 2, the trapped air 2a and the hot water 2h in the cylinder 2 will be pressurized by the descending piston 4. The pressure increases as the piston 4 maintains descending. The pressure-operated valve 3v opens when the hot water pressure reaches a specified critical pressure of the valve 3v. In the present embodiment, it is so designed that the hot water pressure reaches the critical pressure of the valve 3v at time $T_3$, when the piston 4 changes its descending speed from the first speed to the slower second speed. It is intended that the valve 3v is open from time $T_3$ until the piston 4 reaches its LDP at $T_6$.

As the valve 3v opens, the pressurized hot water 2h will enter the chamber 5c of the plunger 5 and further come out from the chamber 5c to the hot water spreading chamber 5w. As the pressurized hot water 2h enters the diametrically widened hot water spreading chamber 5w from the chamber 5c, the hot water radially evenly spreads in the chamber 5w so that the hot water is poured down radially evenly onto the compacted ground coffee 7c through the strainer 5s.

During period $T_3\sim T_5$, a small quantity of hot water is provided onto the ground coffee 7c. It is intended that the ground coffee 7c is macerated with the small quantity of hot water during period $T_4\sim T_5$, while the piston 4 is stopped.

During period $T_5\sim T_6$, the piston 4 descends further and all of the hot water 2h is forced to enter the cylinder 7. As the hot water passes down through the compacted ground coffee 7c, it extracts coffee essence therefrom and turns into coffee liquid. The coffee liquid passes down through the paper filter 8, the strainer 9s, and comes out from the coffee outlet funnel 9f of the filter support block 9. During $T_0\sim T_6$, the cylinder 7 stays at its LDP pressing down the paper filter 8 against the filter support block 9, so that no coffee liquid will leak sideways between the cylinder 7 and the block 9.

During the final stage of the descent of the piston 4 during period $T_5\sim T_6$, most of the air 2a once trapped in the cylinder 2 will be forced out of the cylinder 2 into the cylinder 7. Then, the forced airflow through the ground coffee 7c will cause to free most of the residual coffee liquid in the cylinder 7. At time $T_6$, the piston 4 reaches its LDP and immediately starts ascending at a fast speed to reach its HDP at time $T_9$.

The cylinder 7 starts ascending at time $T_6$ while the plunger 5 is still at its LDP. This causes the coffee-grounds (waste ground coffee 7c) in the cylinder 7 to be kept from ascending with the cylinder 7 by the plunger 5, whereby the coffee grounds separate from the inside wall 7w of the cylinder 7 and stays on the paper filter 8.

During period $T_7\sim T_8$, the controller 25 causes the motor 21 to be rotated in the reverse direction so that the plunger 5 quickly ascends from its LDP to HDP. On the other hand, during period $T_7\sim T_8$, while the cylinder 7 is at its HDP, the bottom of the cylinder 7 is upwardly apart from the paper filter 8.

In the present embodiment, the paper filter 8 is supplied continually from a paper filter roll (not shown). During period $T_7\sim T_8$, the used part of the paper filter 8, together with the coffee-grounds thereon, is moved sideways, to be discarded, and is replaced with a new part of paper filter by a filter feeding device (not shown). Such filter feeding and coffee-grounds discarding process is a prior known art and, therefore, no detail mechanism for this process is shown.

The cylinder 7 quickly descends from its HDP to LDP during $T_8\sim T_9$. At time $T_9$, therefore, a new part of paper filter 8 is placed on the filter support block 9 and is tightly sandwiched between the cylinder 7 and the block 9.

At time $T_9$, all of the mechanism of the apparatus 100 have reverted to the initial stand-by state, the switch 24 is, therefore, ON, and the apparatus 100 is ready for dispensing another cup of coffee. The cams 13 and 17 make one complete revolution during period $T_1\sim T_9$. The time period $T_0\sim T_9$ for the entire coffee dispensing process is about 20 seconds in the present embodiment. The diagrammatic timing chart of FIG. 2 is for explanation purposes and the time intervals between reference times ($T_0$, $T_1$, $T_2$, etc.) are, therefore, not necessarily shown in exact proportion to the actual time intervals practiced in the present invention.

It should also be understood that various changes and modifications may be made in the above described embodiment which provides the characteristics of the present invention without departing from the spirit and principle thereof particularly as defined in the following claims.

What is claimed is:

1. A coffee brewing apparatus, comprising:
   (a) a frame;
   (b) a first cylinder connected to said frame for containing a quantity of hot water therein, said first cylinder having a bottom;
   (c) means for pressurizing said first cylinder internally;
   (d) a vertically extending shaft fixedly connected to said bottom of said first cylinder, said shaft having a hot water release channel vertically therethrough;
   (e) a hot water release valve disposed in said hot water release channel which opens when said first cylinder containing hot water is internally pressurized to a predetermined pressure by said pressurizing means;
   (f) a vertically movable second cylinder for holding ground coffee therein, said second cylinder being disposed below said first cylinder coaxially therewith and supported by said frame in a vertically movable manner, said second cylinder having a top opening and a bottom opening;
   (g) a vertically movable and vertically extending plunger having a cylindrical internal chamber and a bottom section, said plunger being sealingly and slidably connected with said shaft in a manner that said chamber communicates with inside of said first cylinder when said valve is open, said bottom section being adapted to enter said second cylinder through said top opening thereof to be fitted in said second cylinder sealingly and slidingly so as to compact ground coffee in said second cylinder when said plunger is lowered;
   (h) means for vertically moving said second cylinder; and
   (i) means for vertically moving said plunger.

2. A coffee brewing apparatus according to claim 1, wherein said apparatus further comprising:
   (j) a filter support member fixedly connected to said frame and disposed below said second cylinder; and
   (k) a filter disposed on said filter support member in a manner that said filter is sandwiched between said filter support member and said second cylinder so that said filter covers said bottom opening of said second cylinder when said second cylinder is at a lowered level.

3. A coffee brewing apparatus according to claim 1, wherein said first cylinder has a top opening and said means for pressurizing said first cylinder internally is a vertically movable piston that is disposed coaxially with said first cylinder and is adapted to enter said first cylinder internally through said top opening thereof and sealingly and slidingly fit said first cylinder internally.

4. A coffee brewing apparatus according to claim 1, wherein said hot water release valve is a pressure-operated valve.

5. A coffee brewing apparatus according to claim 1, wherein said bottom section of said plunger has a hot water spreading chamber, said hot water spreading chamber having a diameter greater than a diameter of said cylindrical chamber of said plunger and being communicated with inside of said first cylinder when said hot water release valve is open.

6. A coffee brewing apparatus, comprising:

(a) a frame;

(b) a first cylinder connected to said frame for containing a quantity of hot water therein, said first cylinder having a top opening and a bottom;

(c) a vertically movable piston for pressurizing hot water in said first cylinder, said piston being disposed coaxially with said first cylinder and being adapted to enter said first cylinder through said top opening thereof and sealingly and slidingly fit said first cylinder internally;

(d) a vertically extending shaft fixedly connected to said bottom of said first cylinder, said shaft having a hot water release channel vertically therethrough;

(e) a pressure-operated hot water release valve disposed in said hot water release channel which opens when hot water in said first cylinder is pressurized to a predetermined pressure by said piston;

(f) a vertically movable second cylinder for holding ground coffee therein, said second cylinder being disposed below said first cylinder coaxially therewith and supported by said frame in a vertically movable manner, said second cylinder having a top opening and a bottom opening;

(g) a vertically movable and vertically extending plunger having a cylindrical internal chamber and a bottom section, said plunger being sealingly and slidably connected with said shaft in a manner that said chamber communicates with inside of said first cylinder when said valve is open, said bottom section being adapted to enter said second cylinder through said top opening thereof to be fitted in said second cylinder sealingly and slidingly so as to compact ground coffee in said second cylinder when said plunger is lowered;

(h) a filter support member fixedly connected to said frame and disposed below said second cylinder;

(i) a filter disposed on said filter support member in a manner that said filter is sandwiched between said filter support member and said second cylinder so that said filter covers said bottom opening of said second cylinder when said second cylinder is at a lowered level;

(j) means for vertically moving said piston;

(k) means for vertically moving said plunger; and (l) means for vertically moving said second cylinder.

7. A coffee brewing apparatus according to claim 6, wherein said means for vertically moving said piston and said means for vertically moving said second cylinder have a first actuating mechanism including a first cam and a second actuating mechanism including a second cam, respectively, said first cam and said second cam being fixedly mounted on a common cam shaft that is driven by a motor.

8. A coffee brewing apparatus according to claim 6, wherein said means for vertically moving said plunger comprises a bi-directional motor, a bi-directionally rotatable vertical screw shaft drivably connected to said motor, and an arm, connected with said plunger, that can be vertically moved by said screw shaft.

9. A coffee brewing apparatus, comprising:

(a) a frame;

(b) a first cylinder connected to said frame for containing hot water therein;

(c) means for pressurizing said first cylinder internally;

(d) a vertically extending shaft connected to said first cylinder, said shaft having a hot water release channel for releasing hot water in said first cylinder therethough;

(e) a hot water release valve which opens when the hot water in said first cylinder is pressurized to a predetermined pressure by said pressurizing means;

(f) a second cylinder for holding ground coffee therein, said second cylinder being disposed below said first cylinder and supported by said frame in a vertically movable manner, said second cylinder having a top opening and a bottom opening;

(g) a vertically movable and vertically extending plunger having an internal chamber and a bottom section, said plunger being sealingly and slidably connected with said shaft in a manner that said chamber is communicatable with inside of said first cylinder, said bottom section being adapted to enter said second cylinder through said top opening thereof to be fitted in said second cylinder sealingly and slidingly so as to compact ground coffee in said second cylinder when said plunger is lowered; and (h) means for vertically moving said plunger.

* * * * *